US012693196B2

(12) United States Patent
Kobayashi

(10) Patent No.: US 12,693,196 B2
(45) Date of Patent: Jul. 28, 2026

(54) TEST APPARATUS

(71) Applicant: DISCO CORPORATION, Tokyo (JP)

(72) Inventor: Makoto Kobayashi, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 257 days.

(21) Appl. No.: 18/749,791

(22) Filed: Jun. 21, 2024

(65) Prior Publication Data

US 2025/0012688 A1 Jan. 9, 2025

(30) Foreign Application Priority Data

Jul. 5, 2023 (JP) ................................. 2023-110758

(51) Int. Cl.
G01N 3/20 (2006.01)
G01N 3/02 (2006.01)
(52) U.S. Cl.
CPC ................. G01N 3/20 (2013.01); G01N 3/02 (2013.01)
(58) Field of Classification Search
CPC ................................... G01N 3/20; G01N 3/02
See application file for complete search history.

(56) References Cited

U.S. PATENT DOCUMENTS

| | | | | |
|---|---|---|---|---|
| 11,125,665 B2 * | 9/2021 | Tanie | ........................ | G01N 3/20 |
| 11,143,580 B2 * | 10/2021 | Takii | ........................ | G01N 3/32 |
| 11,162,881 B2 * | 11/2021 | Saito | ........................ | G01N 3/08 |

FOREIGN PATENT DOCUMENTS

JP 2020094832 A 6/2020

* cited by examiner

*Primary Examiner* — Kristina M Deherrera
*Assistant Examiner* — Jean F Morello
(74) *Attorney, Agent, or Firm* — GREER BURNS & CRAIN, LTD.

(57) ABSTRACT

A test apparatus includes a support base that supports an undersurface of a chip, a pressing unit that presses the chip supported by the support base, and a load measuring instrument that measures a load applied when the pressing unit presses the chip. The pressing unit includes a first test indenter that performs a three-point bending test by pressing the chip supported by the support base and a second test indenter that performs a four-point bending test by pressing the chip supported by the support base, and the first test indenter and the second test indenter are configured to be selectable when the chip supported by the support base is pressed by the pressing unit.

5 Claims, 8 Drawing Sheets

CONTROLLER — 400

CONTROLLER —400

227

227-1

228

228-2     228-3

TEST APPARATUS

BACKGROUND OF THE INVENTION

Field of the Invention

The present invention relates to a test apparatus that measures the strength of a test piece.

Description of the Related Art

A three-point bending test is widely used to measure the strength of a test piece. Moreover, a test apparatus for measuring the strength of a test piece by the three-point bending test has been disclosed (see Japanese Patent Laid-Open No. 2020-94832, for example).

SUMMARY OF THE INVENTION

Meanwhile, a four-point bending test for measuring the strength of a test piece is also widely used. A test apparatus that can perform a plurality of kinds of tests is therefore desired.

It is accordingly an object of the present invention to provide a test apparatus that can perform a plurality of kinds of tests.

In accordance with an aspect of the present invention, there is provided a test apparatus including a support base configured to support a lower surface of a test piece, a pressing unit configured to press the test piece supported by the support base, and a load measuring instrument configured to measure a load applied when the pressing unit presses the test piece. The pressing unit includes a first test indenter configured to perform a first test by pressing a first test piece supported by the support base, and a second test indenter configured to perform a second test different from the first test by pressing a second test piece supported by the support base. The first test indenter and the second test indenter are configured to be selectable when the first test piece or the second test piece supported by the support base is pressed by the pressing unit.

Preferably, the support base includes a pair of supporting units that are arranged in such a manner as to have a predetermined interval from each other and that each extend in a first direction to support the lower surface of the test piece, the first test indenter includes a first end portion that abuts against and presses an upper surface of the first test piece supported by the supporting units and that extends in the first direction, and the second test indenter includes a second end portion and a third end portion that each abut against and press an upper surface of the second test piece supported by the supporting units and that extend in the first direction, the third end portion being adjacent to the second end portion. Preferably, the first test indenter and the second test indenter are juxtaposed to each other in the first direction.

Preferably, the support base includes a first test region on which the first test piece to be pressed by the first test indenter is to be mounted and a second test region that is adjacent to the first test region in the first direction and on which the second test piece to be pressed by the second test indenter is to be mounted, the first test region faces the first test indenter, and the second test region faces the second test indenter.

Preferably, the test apparatus further includes a transporting unit that has a holding surface for holding the first test piece and the second test piece and that mounts the first test piece and the second test piece thus held onto the support base, and the transporting unit transports the first test piece to be subjected to the first test to the first test region and transports the second test piece to be subjected to the second test to the second test region.

The present invention produces an effect of being able to perform a plurality of kinds of tests.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

An embodiment of the present invention will hereinafter be described in detail with reference to the drawings. The present invention is not limited by contents described in the following embodiment. In addition, constituent elements described in the following include constituent elements readily conceivable by those skilled in the art and essentially identical constituent elements. Further, configurations described in the following can be combined with each other as appropriate. In addition, various omissions, replacements, or modifications of configurations can be performed without departing from the spirit of the present invention.

Figure 1:
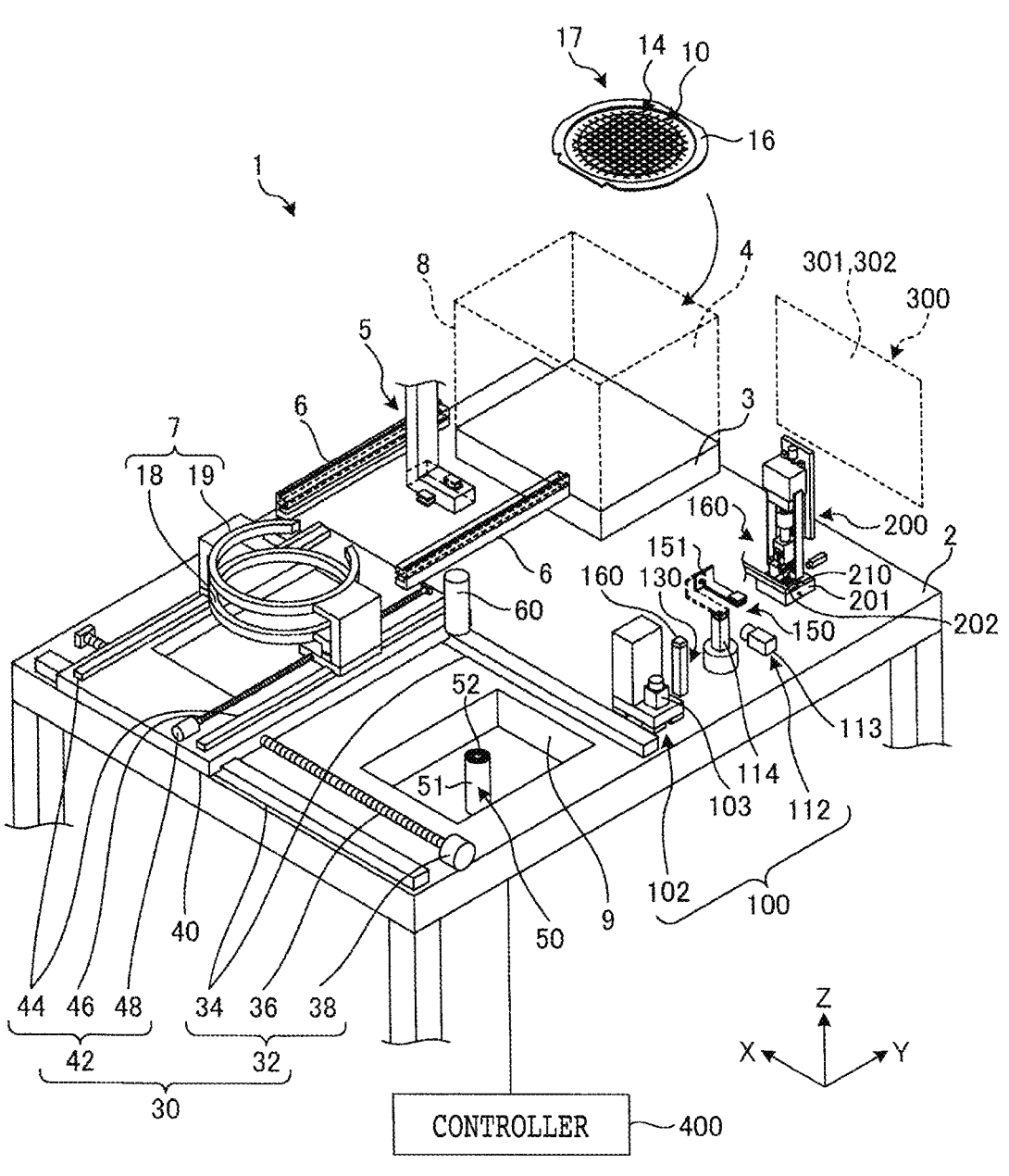
FIG. 1 is a perspective view illustrating a part of an example of a configuration of a test apparatus according to an embodiment.
Figure 2:
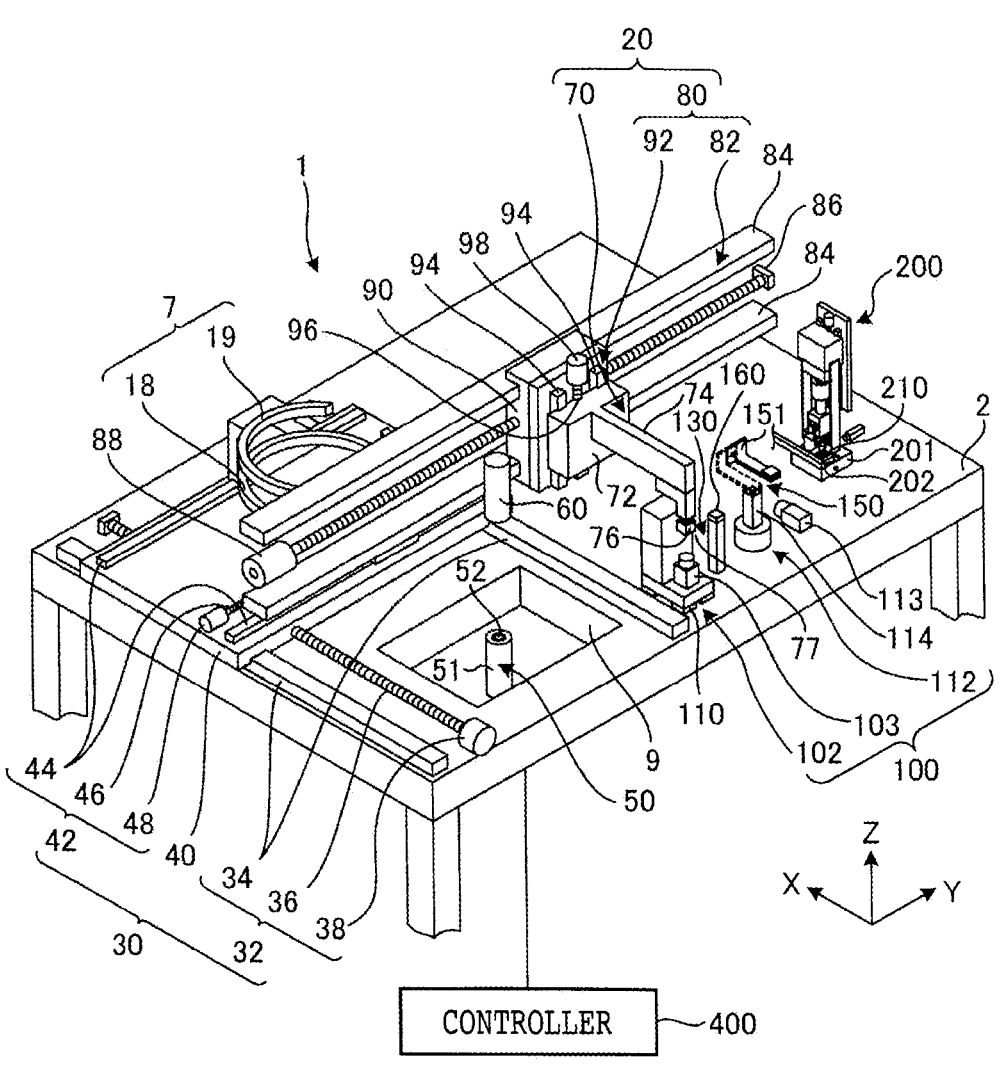
FIG. 2 is a perspective view of principal parts of the test apparatus illustrated in FIG. 1.
Figure 3:
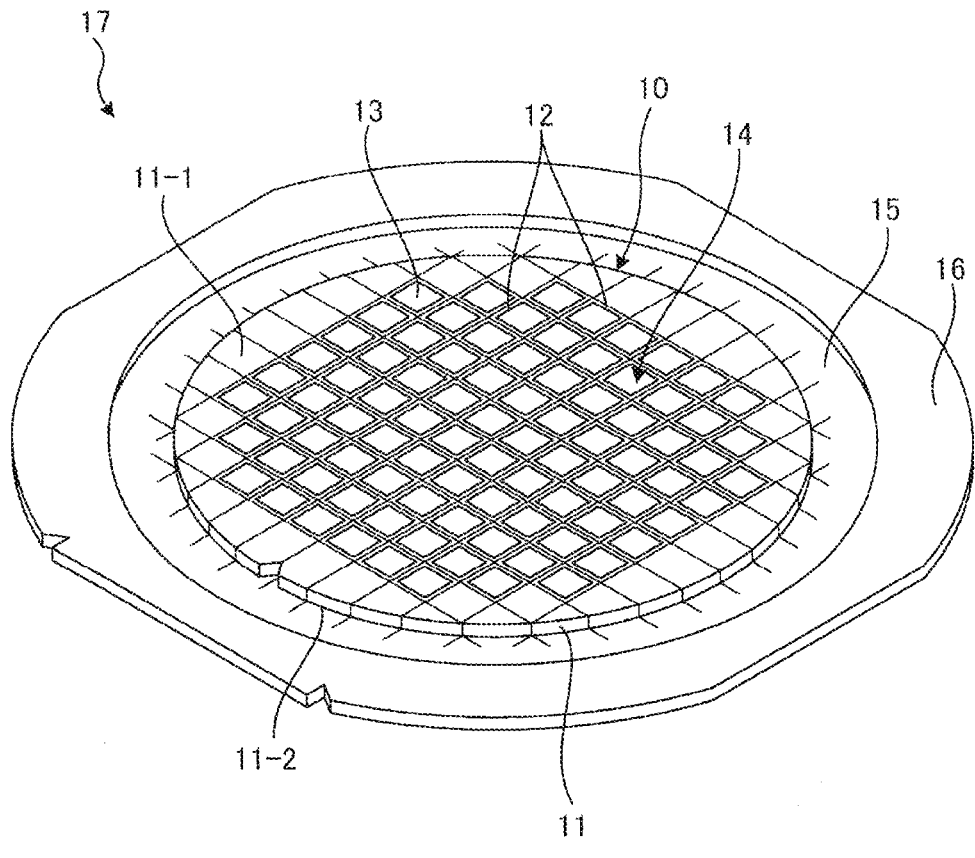
FIG. 3 is a perspective view of a wafer divided into chips to be measured by the test apparatus illustrated in FIG. 1.

A test apparatus according to the embodiment of the present invention will be described with reference to the drawings. FIG. 1 is a perspective view illustrating a part of an example of a configuration of the test apparatus according to the embodiment. FIG. 2 is a perspective view of principal parts of the test apparatus illustrated in FIG. 1. FIG. 3 is a perspective view of a wafer divided into chips to be measured by the test apparatus illustrated in FIG. 1.

The test apparatus 1 illustrated in FIG. 1 and FIG. 2 according to the embodiment is a chip destroying apparatus that measures the strength of chips 14 by destroying the chips 14 as test pieces individually divided from a wafer 10 illustrated in FIG. 3.

In the embodiment, the wafer 10 is a semiconductor wafer, an optical device wafer, or the like in a disk shape that has silicon, sapphire, gallium, or the like as a substrate 11. The wafer 10 has devices 13 formed in regions demarcated in a lattice manner by a plurality of planned dividing lines 12 formed in a lattice manner on a top surface 11-1 of the substrate 11. In the embodiment, an adhesive tape 15, which is a supporting member having an outer circumferential edge thereof fitted with an annular frame 16, is affixed to an undersurface 11-2 of the wafer 10, and the wafer 10 is thus supported by the annular frame 16, thereby constituting a wafer unit 17. That is, in the embodiment, the wafer 10 is supported by the adhesive tape 15. In addition, the wafer 10 is divided into individual chips 14 along the planned dividing lines 12. Incidentally, a chip 14 includes a part of the substrate 11 and a device 13.

Incidentally, while the wafer 10 has the devices 13 formed on the top surface 11-1 of the substrate 11 in the embodiment, the devices 13 may not be formed on the top surface 11-1 in a case where the test apparatus 1 is used to evaluate the appropriateness of processing conditions of what is generally called a post-process in which the wafer 10 is divided into individual chips 14 in the present invention.

As illustrated in FIG. 1, the test apparatus 1 includes a cassette mounting base 3 that is provided on an apparatus main body 2 and on which a cassette 4 housing a plurality of wafer units 17 is mounted, a loading and unloading unit 5 that loads and unloads a wafer unit 17 into and from the cassette 4, a pair of temporary placement rails 6 on which a wafer unit 17 unloaded from the cassette 4 or a wafer unit 17 before being loaded into the cassette 4 is temporarily placed, a frame fixing unit 7, and a controller 400.

The cassette 4 is a housing container that houses a plurality of wafer units 17 at intervals in a Z-axis direction parallel with a vertical direction. The cassette 4 is provided with an opening 8 for loading or unloading a wafer 10. The cassette 4 is mounted on an upper surface of the cassette mounting base 3. The cassette mounting base 3 raises or lowers the cassette 4 in the Z-axis direction parallel with the vertical direction.

The pair of temporary placement rails 6 are provided on the apparatus main body 2 at both ends in a width direction of the opening 8 of the cassette 4 mounted on the cassette mounting base 3, and extend linearly in a Y-axis direction as a first direction parallel with a horizontal direction. The pair of temporary placement rails 6 are arranged in parallel with each other, and are arranged at intervals from each other along an X-axis direction as a second direction orthogonal to the Y-axis direction and parallel with the horizontal direction. The annular frame 16 of the wafer unit 17 is temporarily placed on the pair of temporary placement rails 6.

The frame fixing unit 7 includes a frame supporting member 18 in an annular shape, a frame holding member 19 in an annular shape, the frame holding member 19 being disposed above the frame supporting member 18 and fixed, and a raising and lowering mechanism, not illustrated, which raises and lowers the frame supporting member 18. Before the frame supporting member 18 is raised, an upper surface of the frame supporting member 18 is positioned on a same plane as upper surfaces of the temporary placement rails 6, and the annular frame 16 of the wafer unit 17 is mounted on the frame supporting member 18. After the annular frame 16 of the wafer unit 17 is mounted on the upper surface of the frame supporting member 18 of the frame fixing unit 7, the raising and lowering mechanism raises the frame supporting member 18, and the frame fixing unit 7 fixes the wafer unit 17 by sandwiching the annular frame 16 between the frame holding member 19 and the frame supporting member 18.

The loading and unloading unit 5 is provided in such a manner as to be movable in the Y-axis direction by a moving mechanism not illustrated in the figures. The loading and unloading unit 5 unloads a wafer unit 17 from the cassette 4 and temporarily places the wafer unit 17 on the temporary placement rails 6, thereafter takes out the wafer unit 17 to the upper surface of the lowered frame supporting member 18 of the frame fixing unit 7, and mounts the wafer unit 17 on the upper surface of the frame supporting member 18. In addition, the loading and unloading unit 5 loads a wafer unit 17 that is present on the upper surface of the lowered frame supporting member 18 of the frame fixing unit 7 into the cassette 4 via the temporary placement rails 6.

In addition, as illustrated in FIG. 2, the test apparatus 1 includes a moving mechanism 30 for moving the frame fixing unit 7 in the Y-axis direction and the X-axis direction, a thrust-up mechanism 50, an imaging camera 60, a transporting unit 20, a chip observation mechanism 100, and a strength measuring mechanism 200.

The moving mechanism 30 includes an X-axis moving mechanism 32 that is provided on the apparatus main body 2 and moves a moving table 40 in the X-axis direction, and a Y-axis moving mechanism 42 that is provided on the moving table 40 moved in the X-axis direction by the X-axis moving mechanism 32 and moves the frame fixing unit 7 in the Y-axis direction. The X-axis moving mechanism 32 moves the moving table 40, that is, the frame fixing unit 7, in the X-axis direction between a position aligned with the pair of temporary placement rails 6 in the Y-axis direction and a position separated from the pair of temporary placement rails 6. The moving mechanisms 32 and 42 include well-known ball screws 36 and 46 provided in such a manner as to be rotatable about axes thereof, well-known motors 38 and 48 that rotate the ball screws 36 and 46 about the axes, and well-known guide rails 34 and 44 that support the moving table 40 or the frame fixing unit 7 movably in the X-axis direction or the Y-axis direction.

The thrust-up mechanism 50 is disposed below the frame fixing unit 7 positioned at the position separated from the pair of temporary placement rails 6 by the X-axis moving mechanism 32. The thrust-up mechanism 50 is provided within a recessed portion 9 of the apparatus main body 2. The thrust-up mechanism 50 thrusts up one of the chips 14 via the adhesive tape 15 of the wafer unit 17 fixed by the frame fixing unit 7 positioned at the position separated from the pair of temporary placement rails 6 by the X-axis moving mechanism 32.

The thrust-up mechanism 50 is integrally connected as a whole to a raising and lowering mechanism (not illustrated) constituted by a motor or the like, such that the thrust-up mechanism 50 is raised or lowered along the Z-axis direction. The thrust-up mechanism 50 includes a tape holding unit 51 formed in a hollow cylindrical shape and a thrust-up unit 52 in a quadrangular prismatic shape disposed within the tape holding unit 51. An upper surface of the tape holding unit 51 is formed flat in parallel with the horizontal direction and has a plurality of suction grooves concentrically formed therein along a circumferential direction of the tape holding unit 51. Each of the suction grooves is connected to a suction source formed by an ejector or the like via a suction passage formed within the thrust-up mechanism 50 and an opening and closing valve.

The thrust-up unit 52 is formed in a quadrangular shape in which the planar shape of an upper surface of the thrust-up unit 52 is smaller than the planar shape of the chip 14. The thrust-up unit 52 is connected to a raising and lowering unit formed by a motor or the like and can therefore be raised and lowered along the Z-axis direction relative to the tape holding unit 51.

In a state in which the wafer unit 17 including the annular frame 16 held by the frame fixing unit 7 is positioned above the thrust-up mechanism 50, the suction grooves of the upper surface of the tape holding unit 51 are sucked by the suction source, and the thrust-up mechanism 50 thus holds under suction the adhesive tape 15 on a periphery of the chip 14 to be picked up on the upper surface of the tape holding unit 51. When the thrust-up mechanism 50 holds under suction the adhesive tape 15 on the periphery of the chip 14 to be picked up on the upper surface of the tape holding unit 51 and the thrust-up unit 52 is raised, the chip 14 is thrust up to a position above the adhesive tape 15, and a peripheral edge of the chip 14 is peeled off from the adhesive tape 15. Incidentally, the dimensions of the thrust-up mechanism 50 are adjusted as appropriate according to the size of the chip 14.

The imaging camera 60 is disposed in such a position as to be able to image the whole of the wafer 10 of the wafer unit 17 fixed by the frame fixing unit 7 above the recessed portion 9. The imaging camera 60 includes an imaging element that images the whole of the wafer 10 fixed by the frame fixing unit 7. The imaging element is, for example, a charge-coupled device (CCD) imaging element or a complementary metal oxide semiconductor (CMOS) imaging element. The imaging camera 60 photographs the whole of the wafer 10 of the wafer unit 17 fixed by the frame fixing unit 7, to obtain an image, for example, for performing alignment between a predetermined chip 14 of the wafer 10 and the thrust-up mechanism 50, and outputs the obtained image to the controller 400.

The transporting unit 20 includes a pickup mechanism 70 and a collet moving mechanism 80 as collet moving means.

The pickup mechanism 70 picks up the predetermined chip 14 thrust up by the thrust-up mechanism 50 from the wafer 10 that has been divided into a plurality of chips 14 and is supported by the adhesive tape 15. As illustrated in FIG. 2, the pickup mechanism 70 includes a moving base 72 that is moved in the Y-axis direction and the Z-axis direction by the collet moving mechanism 80, an arm 74 extending from the moving base 72 in a direction of separating from the collet moving mechanism 80 in the X-axis direction, and a collet 76 that is provided to a distal end of the arm 74 and holds the chip 14.

The collet 76 is attached to a lower end portion of the distal end of the arm 74. A lower surface 77 of the collet 76 is connected to a suction source formed by an ejector or the like and is sucked by the suction source. The lower surface 77 thus forms a holding surface that holds the chip 14 under suction. That is, the transporting unit 20 has the lower surface 77 as the holding surface that holds the chip 14. The pickup mechanism 70 holds under suction the chip 14 thrust up by the thrust-up mechanism 50 on the lower surface 77 of the collet 76, and is raised by the collet moving mechanism 80. The pickup mechanism 70 thus picks up the predetermined chip 14 from the adhesive tape 15.

In addition, in the embodiment, the test apparatus 1 may include, on the upper surface side of the thrust-up mechanism 50, a load cell as measuring means for measuring a load applied to the chip 14 when the chip 14 is to be picked up from the adhesive tape 15. The load cell outputs a measurement result to the controller 400. Incidentally, in the present invention, the load cell as measuring means may be provided on the lower surface 77 of the collet 76 of the pickup mechanism 70.

The collet moving mechanism 80 moves the collet 76 between a pickup position at which the chip 14 is picked up from the adhesive tape 15 and a mounting position at which the chip 14 is mounted onto a support base 210 to be described later in the strength measuring mechanism 200. The collet moving mechanism 80 includes a second Y-axis moving mechanism 82 that is provided on the apparatus main body 2 and moves a moving table 90 in the Y-axis direction, and a Z-axis moving mechanism 92 that is provided on the moving table 90 moved in the Y-axis direction by the second Y-axis moving mechanism 82 and that moves the moving base 72, that is, the pickup mechanism 70, in the Z-axis direction.

The second Y-axis moving mechanism 82 moves the moving table 90, that is, the pickup mechanism 70, from the pickup position, at which the upper surface of the thrust-up mechanism 50 and the lower surface 77 of the collet 76 face each other in the Z-axis direction, toward the strength measuring mechanism 200 along the Y-axis direction. The moving mechanisms 82 and 92 include well-known ball screws 86 and 96 provided in such a manner as to be rotatable about axes thereof, well-known motors 88 and 98 that rotate the ball screws 86 and 96 about the axes, and well-known guide rails 84 and 94 that support the moving table 90 or the pickup mechanism 70 movably in the Y-axis direction or the Z-axis direction.

The chip observation mechanism 100 images and observes the top surface 11-1, the undersurface 11-2, and side surfaces of the chip 14. As illustrated in FIG. 1 and FIG. 2, the chip observation mechanism 100 includes a lower side imaging unit 102 disposed on the apparatus main body 2 at a position next to the thrust-up mechanism 50 in the Y-axis direction, a side imaging unit 112, and a chip inverting mechanism 150 that vertically inverts the chip 14.

The lower side imaging unit 102 includes a lower side imaging camera 103 that images, from below, the chip 14 held by the collet 76 of the pickup mechanism 70. The lower side imaging camera 103 is disposed at a position overlapping a movement path of the collet 76. The lower side imaging camera 103 of the lower side imaging unit 102 images the chip 14 from below, and the lower side imaging unit 102 outputs an image obtained by the imaging to the controller 400.

The side imaging unit 112 images the chip 14 from a side, that is, a side surface of the chip 14. The side imaging unit 112 is disposed next to the lower side imaging unit 102 in the Y-axis direction. In the embodiment, the side imaging unit 112 is disposed on a side more distant from the thrust-up mechanism 50 than the lower side imaging unit 102.

The side imaging unit 112 includes a columnar chip support base 114 that supports the chip 14 and a side surface imaging camera 113 that images a side surface of the chip 14.

The chip support base 114 extends upward from the apparatus main body 2 and is disposed at a position aligned with the lower side imaging camera 103 in the Y-axis direction (that is, at a position overlapping the movement path of the collet 76). The chip support base 114 has an upper surface formed flat in parallel with the horizontal direction. The chip support base 114 supports, on the upper surface thereof, the chip 14 transported by the collet 76 of the pickup mechanism 70. In addition, the chip support base 114 is connected to a rotational driving source not illustrated in the figures and is rotated about an axis parallel with the Z-axis direction by the rotational driving source.

The side surface imaging camera 113 is disposed at a position at which the side surface imaging camera 113 can photograph a side surface of the chip 14 disposed on the upper surface of the chip support base 114. The side surface imaging camera 113 includes an imaging element that images a side surface of the chip 14. The imaging element is, for example, a CCD imaging element or a CMOS imaging element. The side surface imaging camera 113 images a side surface of the chip 14 disposed on the upper surface of the chip support base 114 and outputs an image obtained by the imaging to the controller 400.

Incidentally, because the chip support base 114 is provided at a position overlapping the movement path of the collet 76, the test apparatus 1 can dispose the chip 14 on the upper surface of the chip support base 114 by the collet 76.

The side imaging unit 112 images one side surface of the chip 14 supported by the chip support base 114, by the side surface imaging camera 113. Then, after the chip support base 114 is rotated by a predetermined angle, another side surface of the chip 14 is imaged by the side surface imaging camera 113. In this manner, the side imaging unit 112 images all of the side surfaces of the chip 14 (for example, the side surfaces of four sides of the chip 14) by the side surface imaging camera 113, to obtain images including the thickness of the chip 14, the size of a chip (chipping) formed on the chip 14, and the like, and outputs the obtained images to the controller 400. In addition, by controlling the rotational angle of the chip support base 114, the side imaging unit 112 can adjust the orientation (angle) in the horizontal direction of the chip 14 at a time that the chip 14 is disposed on the strength measuring mechanism 200.

The chip observation mechanism 100 images the top surface 11-1, the undersurface 11-2, and the side surfaces of the chip 14 picked up by the collet 76, by use of the lower side imaging unit 102 and the side imaging unit 112 described above. Incidentally, in the present invention, the side surface imaging camera 113 that images a side surface of the chip 14 may be provided at a position at which the side surface imaging camera 113 can image a side surface of the chip 14 in a state of being held by the collet 76. In this case, a side surface of the chip 14 can be observed without the chip 14 being supported by the chip support base 114. The undersurface 11-2 of the chip 14 or the like can therefore be prevented from being damaged by disposition of the chip 14 on the chip support base 114.

The chip inverting mechanism 150 is disposed above the chip support base 114 of the side imaging unit 112. The chip inverting mechanism 150 is able to rotate a base portion 151 about an axis parallel with the X-axis direction by 180° in a state in which the chip inverting mechanism 150 holds the chip 14 at a distal end portion thereof.

When vertically inverting the chip 14, the chip inverting mechanism 150 rotates the base portion 151 by 180° from a position indicated by a solid line in FIG. 1 and FIG. 2 with respect to the upper surface of the chip support base 114 supporting the chip 14, to position the base portion 151 at a position indicated by a dotted line in FIG. 1 and FIG. 2. The chip inverting mechanism 150 holds the chip 14 under suction at the distal end portion thereof and rotates the base portion 151 by 180°. The chip inverting mechanism 150 thus vertically inverts the chip 14.

The collet 76 of the pickup mechanism 70 holds under suction the chip 14 inverted by the chip inverting mechanism 150. After the holding of the chip 14 under suction by the distal end portion of the chip inverting mechanism 150 is stopped, the collet 76 moved by the collet moving mechanism 80 transports the chip 14 to a position above the lower side imaging unit 102 or to the strength measuring mechanism 200. In this manner, the chip inverting mechanism 150 vertically inverts the chip 14.

Figure 4:
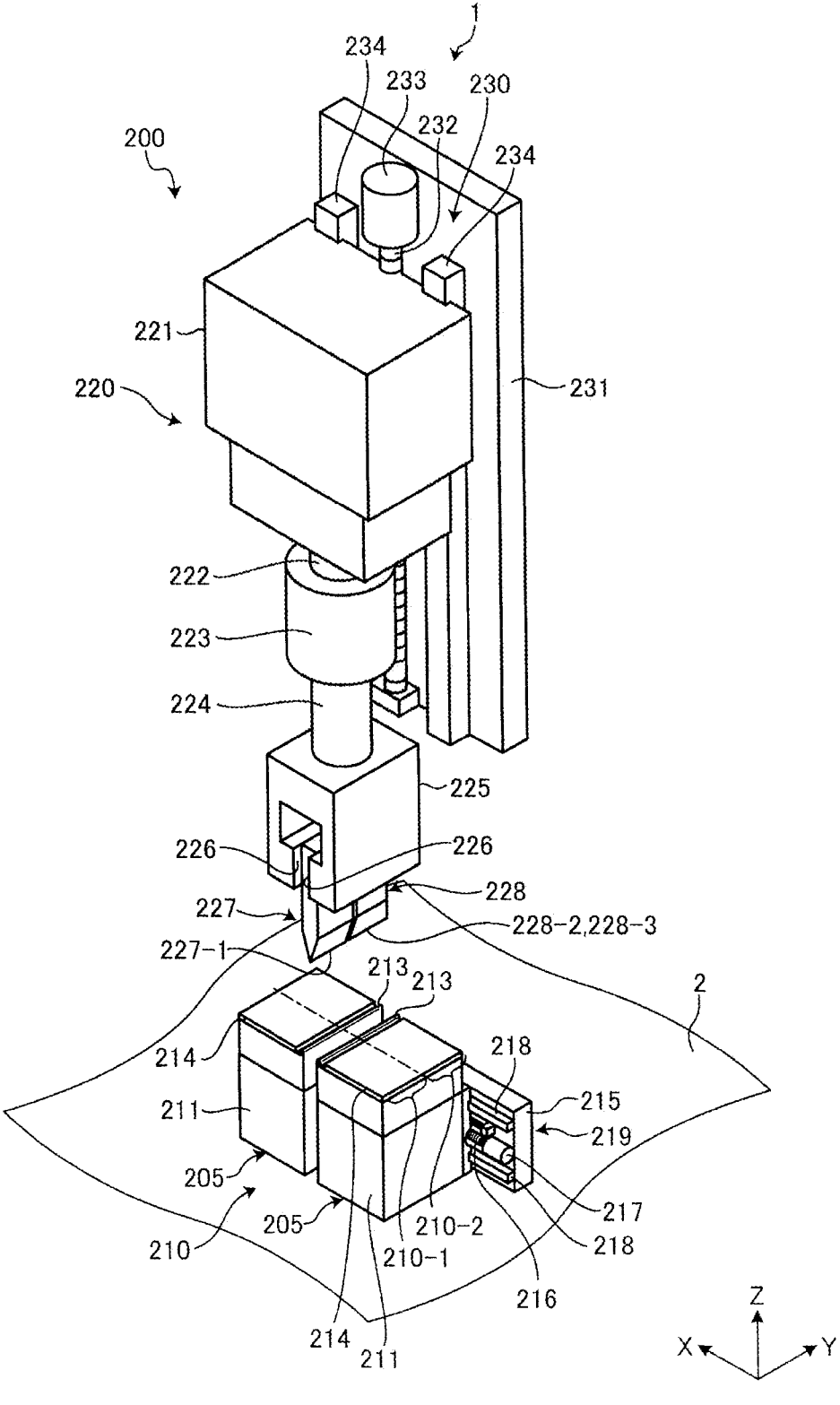
FIG. 4 is a perspective view illustrating a strength measuring mechanism of the test apparatus illustrated in FIG. 1.
Figure 5:
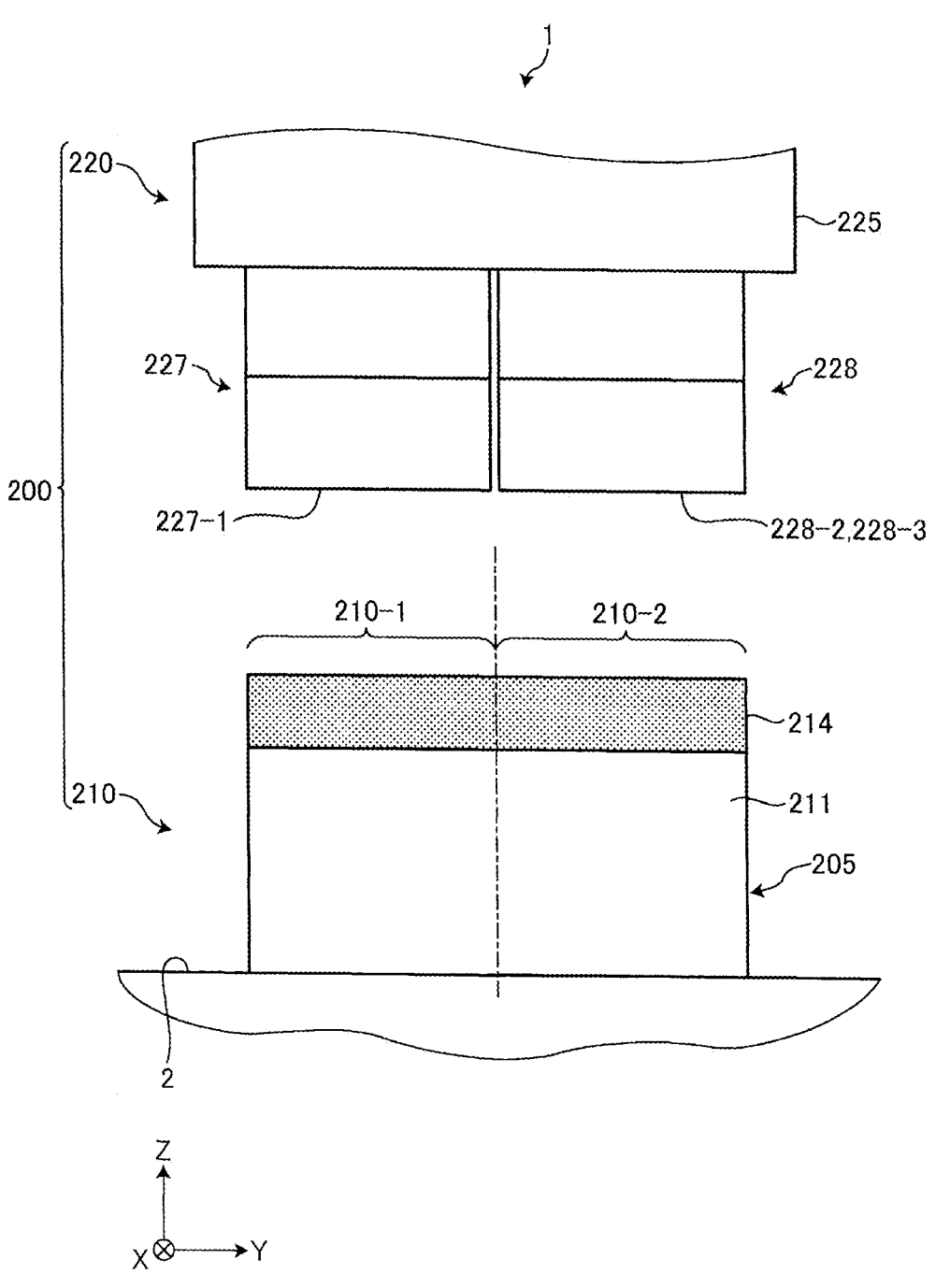
FIG. 5 is a side view of a support base and indenters of the strength measuring mechanism illustrated in FIG. 4 as viewed from an X-axis direction as a second direction orthogonal to a first direction.
Figure 6:
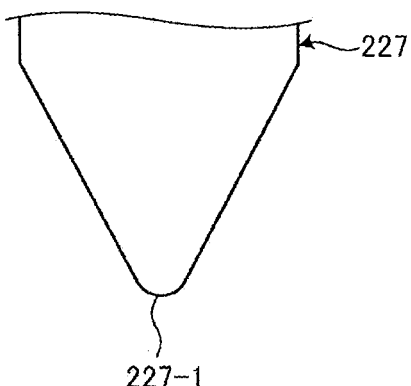
FIG. 6 is a front view illustrating a distal end of a first test indenter of the strength measuring mechanism illustrated in FIG. 4.
Figure 7:
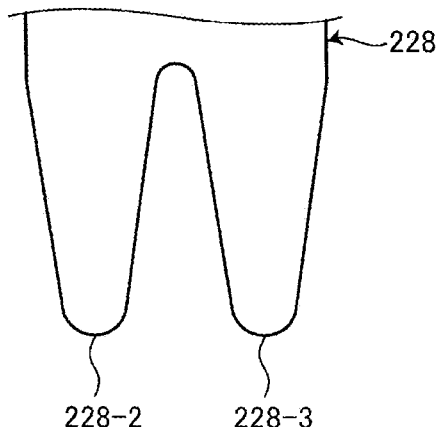
FIG. 7 is a front view illustrating a distal end of a second test indenter of the strength measuring mechanism illustrated in FIG. 4.

FIG. 4 is a perspective view illustrating the strength measuring mechanism of the test apparatus illustrated in FIG. 1. FIG. 5 is a side view of a support base and indenters of the strength measuring mechanism illustrated in FIG. 4 as viewed from the X-axis direction as the second direction orthogonal to the first direction. FIG. 6 is a front view illustrating a distal end of a first test indenter of the strength measuring mechanism illustrated in FIG. 4. FIG. 7 is a front view illustrating a distal end of a second test indenter of the strength measuring mechanism illustrated in FIG. 4.

The strength measuring mechanism 200 is measuring means for measuring the strength of the chip 14 picked up by the pickup mechanism 70. The strength measuring mechanism 200 is disposed next to the chip observation mechanism 100 in the Y-axis direction. In the embodiment, the strength measuring mechanism 200 is disposed on a side more distant from the thrust-up mechanism 50 than the chip observation mechanism 100. In addition, in the embodiment, the strength measuring mechanism 200 is disposed at a position overlapping the movement path of the collet 76.

As illustrated in FIG. 4, the strength measuring mechanism 200 includes a lower container 201 (illustrated in FIG. 1 and FIG. 2), the support base 210, and a pressing unit 220. The lower container 201 is disposed on the apparatus main body 2 and is formed in a box shape having an opening portion 202 formed on an upper side.

The support base 210 supports the chip 14 that has been picked up by the collet 76 of the pickup mechanism 70 and whose top surface 11-1, undersurface 11-2, and side surfaces have been imaged by the chip observation mechanism 100. The support base 210 is housed within the lower container 201 and is disposed at a position overlapping the movement path of the collet 76. Accordingly, the collet moving mechanism 80 moves the collet 76 from a position facing the thrust-up mechanism 50 in the Z-axis direction to a position facing the support base 210 in the Z-axis direction.

As illustrated in FIG. 4, the support base 210 includes a pair of elongated supporting units 205 that support the chip 14, and a support base moving mechanism 219 that changes the respective positions in the X-axis direction of the elongated supporting units 205 and an interval between the pair of elongated supporting units 205. The pair of elongated supporting units 205 are disposed at a predetermined interval from each other in the X-axis direction. The elongated supporting units 205 each include a supporting member 211 and a contact member 214.

The supporting member 211 is formed in a rectangular parallelepipedic shape. The supporting members 211 of the pair of elongated supporting units 205 are arranged in such a manner as to be spaced from each other in the X-axis direction, and the supporting members 211 are provided with a predetermined interval from each other. In addition, the pair of supporting members 211 are disposed in such a manner that a longitudinal direction of upper surfaces thereof is along the Y-axis direction. The chip 14 whose strength is to be measured is disposed on the upper surface sides of the pair of supporting members 211 by the collet 76 and the like. To this end, the transporting unit 20 mounts the chip 14 picked up from the wafer unit 17, onto the support base 210. Incidentally, in the embodiment, the undersurface 11-2 side as the lower surface of the chip 14 is mounted on and supported by the supporting members 211, that is, the support base 210.

Columnar (bar-shaped) supporting protrusions 213 (corresponding to supporting portions) that protrude upward are formed on mutually adjacent edge portions of the respective upper surfaces of the supporting members 211. The upper surfaces are covered by the contact members 214 except for the edge portions described above. That is, the support base 210 has a pair of supporting protrusions 213. The supporting protrusions 213 are formed, for example, of metal such as stainless steel. The supporting protrusions 213 are arranged at a predetermined interval and each extend in parallel with the Y-axis direction to support the undersurface 11-2 side of the chip 14. Incidentally, in the embodiment, a sectional shape of the upper surfaces of the supporting protrusions 213 is formed as an upwardly protruding curved surface.

The contact members 214 are formed of a material (for example, sponge rubber or the like) more flexible than the supporting protrusions 213, and are formed in a plate shape having a uniform thickness. The contact members 214 are formed in a rectangular planar shape, and the thickness of the contact members 214 in a state of not being deformed is larger than an amount of protrusion of the supporting protrusions 213 from the upper surfaces of the supporting members 211.

The contact members 214 support the chip 14 in such a manner that the undersurface 11-2 of the chip 14 is superposed on the upper surfaces of the contact members 214. The upper surfaces of the contact members 214 therefore support the undersurface 11-2 of the chip 14. Incidentally, in the embodiment, the upper surfaces of the contact members 214 in a state of not being deformed are arranged approximately 1 mm above upper ends of the supporting protrusions 213. The chip 14 disposed over the supporting members 211 is therefore in contact with the upper surfaces of the contact members 214 with the undersurface 11-2 at an interval from the supporting protrusions 213. In addition, when an indenter 227 or 228 presses the chip 14, the contact members 214 are deformed, and upper ends 213-1 of the supporting protrusions 213 come into contact with the undersurface 11-2 of the chip 14 and support the undersurface 11-2.

The support base moving mechanism 219 moves each of the supporting members 211 in the X-axis direction. The support base moving mechanism 219 includes a ball screw 216 rotatably provided to a fixed plate 215 fixed to the apparatus main body 2, a motor 217 that rotates the ball screw 216, and guide rails 218 that support each of the supporting members 211 movably in the X-axis direction.

The pressing unit 220 presses the chip 14 supported by the support base 210, measures a load applied to the pressing unit 220 at the time of the pressing of the chip 14, and destroys the chip 14 supported by the support base 210 by the pressing. The pressing unit 220 is provided above the lower container 201.

As illustrated in FIG. 4, the pressing unit 220 includes a moving mechanism 230 as moving means, a moving base 221, a first test indenter 227, and a second test indenter 228.

The moving mechanism 230 moves the indenters 227 and 228 in the Z-axis direction into relative proximity to the chip 14 supported by the pair of elongated supporting units 205. The moving mechanism 230 includes a supporting plate 231 that extends upward from the apparatus main body 2 and that is fixed to the apparatus main body 2, a ball screw 232 supported by the supporting plate 231 in such a manner as to be rotatable about an axis thereof, a motor 233 that rotates the ball screw 232 about the axis, and guide rails 234 that support the moving base 221 movably in the Z-axis direction.

Longitudinal directions of the supporting plate 231, the ball screw 232, and the guide rails 234 are parallel with the Z-axis direction. The ball screw 232 is screwed in a screw hole provided to the moving base 221. The guide rails 234 are attached to the supporting plate 231. When the motor 233 rotates the ball screw 232 about the axis, the moving mechanism 230 moves the indenters 227 and 228 in the Z-axis direction via the moving base 221.

The moving base 221 is formed in a rectangular parallelepipedic shape. A cylindrical first supporting member 222 extending downward is connected to a lower surface side of the moving base 221. A load measuring instrument 223 as load measuring means formed by a load cell or the like is fixed to a lower end side of the first supporting member 222. The load measuring instrument 223 measures a load applied when the indenter 227 or 228 presses the chip 14 supported by the pair of elongated supporting units 205, and outputs a result of the measurement to the controller 400. That is, the pressing unit 220 includes the load measuring instrument 223 that measures the load applied when the indenter 227 or 228 presses the chip 14 supported by the pair of elongated supporting units 205.

A sandwiching member 225 is attached to the lower side of the load measuring instrument 223 via a cylindrical second supporting member 224. The sandwiching member 225 is formed in substantially a gate shape as viewed from the front. The sandwiching member 225 fixes, between a pair of sandwiching surfaces 226 thereof facing each other, the indenters 227 and 228 for pressing the chip 14 supported by the pair of elongated supporting units 205.

The first test indenter 227 is one for performing a three-point bending test as a first test by pressing the chip 14 supported by the support base 210. The second test indenter 228 is one for performing a four-point bending test as a second test different from the first test by pressing the chip 14 supported by the support base 210. The indenters 227 and 228 are arranged above the elongated supporting units 205 and above a portion between the pair of elongated supporting units 205, extend in the Y-axis direction in parallel with the supporting protrusions 213 of the elongated supporting units 205, and are juxtaposed to each other in the Y-axis direction as illustrated in FIG. 4 and FIG. 5.

The first test indenter 227 is formed in a tapered integral plate shape that decreases in width toward a lower side, and includes, at a lower end thereof, a first end portion 227-1 formed as a downwardly protruding curved surface as illustrated in FIG. 6. The first end portion 227-1 extends in the Y-axis direction. The second test indenter 228 is formed in an integral plate shape and includes, at a lower end thereof, a second end portion 228-2 and a third end portion 228-3 that are each tapered in such a manner as to decrease in width toward a lower side and that are each formed as downwardly protruding curved surfaces as illustrated in FIG. 7. The second end portion 228-2 and the third end portion 228-3 are adjacent to each other in the X-axis direction, extend in the Y-axis direction, and are formed in a mutually identical shape with lower ends thereof being positioned on a same plane.

The first end portion 227-1 as well as the second end portion 228-2 and the third end portion 228-3 each abuts against and presses the top surface 11-1 as the upper surface of the chip 14 supported by the supporting protrusions 213 of the support base 210. Upper ends of the indenters 227 and 228 are supported by the sandwiching member 225 in such a manner as to be parallel with the Y-axis direction. The respective end portions 227-1, 228-2, and 228-3 of the indenters 227 and 228 are arranged above the portion between the pair of elongated supporting units 205. Incidentally, in the embodiment, the first test indenter 227 is disposed nearer the chip observation mechanism 100, that is, on a more upstream side in the path of transportation of the chip 14 by the transporting unit 20, than the second test indenter 228.

In addition, in the test apparatus 1 according to the embodiment, as illustrated in FIG. 4 and FIG. 5, the upper side of the support base 210 on which the chip 14 is mounted includes a first test region 210-1 on which the chip 14 to be pressed by the first test indenter 227 is mounted and a second test region 210-2 that is adjacent to the first test region 210-1 in the Y-axis direction and on which the chip 14 to be pressed by the second test indenter 228 is mounted. The first test region 210-1 faces the first test indenter 227 along the Z-axis direction. The second test region 210-2 faces the second test indenter 228 along the Z-axis direction.

Thus, in the embodiment, the first test region 210-1 and the second test region 210-2 on the support base 210 are juxtaposed to each other in the Y-axis direction. In addition, in the embodiment, an overall length in the Y-axis direction of the support base 210 and an overall length in the Y-axis direction of the indenters 227 and 228 combined are equal to each other, an overall length in the Y-axis direction of the first test region 210-1 and an overall length in the Y-axis direction of the first end portion 227-1 of the first test indenter 227 are substantially equal to each other, and an overall length in the Y-axis direction of the second test region 210-2 and an overall length in the Y-axis direction of each of the second end portion 228-2 and the third end portion 228-3 of the second test indenter 228 are substantially equal to each other.

When the strength measuring mechanism 200 measures the transverse rupture strength of the chip 14, positions in the X-axis direction of the pair of supporting members 211 are adjusted by the support base moving mechanism 219, and the interval between the pair of supporting members 211 is adjusted to an interval corresponding to the size of the chip 14 or the like, in a state in which the moving base 221, the indenters 227 and 228, and the like are positioned above by the moving mechanism 230. The strength measuring mechanism 200 has the chip 14 mounted onto the pair of supporting members 211 by the collet 76 and the like. At this time, both end portions of the chip 14 are supported by the supporting members 211, and a central portion of the chip 14 coincides with the portion between the elongated supporting units 205.

Incidentally, when the undersurface 11-2 side of the chip 14 comes into contact with the supporting protrusions 213 at the time of disposing the chip 14 onto the pair of supporting members 211, the undersurface 11-2 side of the chip 14 may be damaged due to an impact of the disposition. In this case, the transverse rupture strength of the chip 14 may change, and thus it may be difficult to measure the transverse rupture strengths of a plurality of chips 14 under the same conditions.

Therefore, in the embodiment, the strength measuring mechanism 200 is provided with the contact members 214 formed of a flexible material on the upper surface sides of the supporting members 211, and the upper surfaces of the contact members 214 are located above the upper ends of the supporting protrusions 213. In the embodiment, when the chip 14 is disposed on the pair of supporting members 211 of the strength measuring mechanism 200, the chip 14 is in contact with the upper surfaces of the contact members 214 without being in contact with the supporting protrusions 213, and is supported by the upper surfaces. Accordingly, the strength measuring mechanism 200 can prevent the undersurface 11-2 side of the chip 14 from being damaged by contact with the supporting protrusions 213 at the time of disposing the chip 14, and can consequently suppress a change in the transverse rupture strength of the chip 14.

The strength measuring mechanism 200 presses the chip 14 by the indenter 227 or 228 by lowering the moving base 221, the indenters 227 and 228, an upper container 240, and the like by the moving mechanism 230, measures, by the load measuring instrument 223, a load (force in the Z-axis direction) applied to the indenter 227 or 228 by the pressing of the chip 14, and destroys the chip 14 by the indenter 227 or 228 while outputting a result of the measurement to the controller 400 as appropriate. The strength measuring mechanism 200 performs the three-point bending test on the chip 14 by using the pair of supporting protrusions 213 and the first end portion 227-1 of the first test indenter 227, measures a load applied during the three-point bending test, and outputs a result of the measurement to the controller 400. In addition, the strength measuring mechanism 200 performs the four-point bending test on the chip 14 by using the pair of supporting protrusions 213 and the second end portion 228-2 and the third end portion 228-3 of the second test indenter 228, measures a load applied during the four-point bending test, and outputs a result of the measurement to the controller 400.

Incidentally, when the strength measuring mechanism 200 performs the three-point bending test on the chip 14, the strength measuring mechanism 200 supports the chip 14 on the first test region 210-1 of the support base 210, and destroys the supported chip 14 by pressing the chip 14 by the first end portion 227-1 of the first test indenter 227. In addition, when the strength measuring mechanism 200 performs the four-point bending test on the chip 14, the strength measuring mechanism 200 supports the chip 14 on the second test region 210-2 of the support base 210, and destroys the supported chip 14 by pressing the chip 14 by the second end portion 228-2 and the third end portion 228-3 of the second test indenter 228.

The controller 400 controls each of the above-described various units of the test apparatus 1 and makes the test apparatus 1 perform a measurement operation on each chip 14. The controller 400 is a computer including an arithmetic processing device including a microprocessor such as a central processing unit (CPU), a storage device including a memory such as a read only memory (ROM) or a random access memory (RAM), and an input-output interface device. The arithmetic processing device of the controller 400 performs arithmetic processing according to a computer program stored in the storage device, and outputs control signals for controlling the test apparatus 1 to the above-described various units of the test apparatus 1 via the input-output interface device.

In addition, the controller 400 is connected with a display unit 300 as display means including a display screen 301 that displays a state of the measurement operation, an image, or the like, and a touch panel 302 as input means that is connected to the controller 400 and that is used when an operator inputs information or the like to the controller 400 of the test apparatus 1. The display unit 300 is constituted by a liquid crystal display device or the like. The touch panel 302 is stacked on the display screen 301 of the display unit 300.

Figure 8:
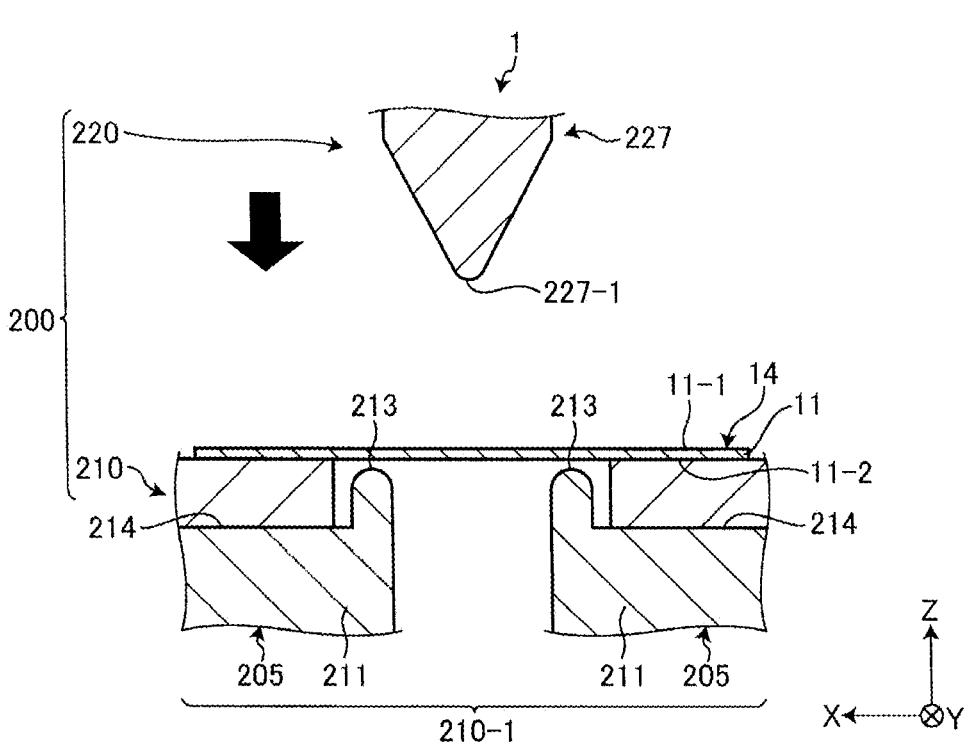
FIG. 8 is a sectional view illustrating a state in which the test apparatus illustrated in FIG. 1 has a chip mounted on a first test region of the support base.
Figure 9:
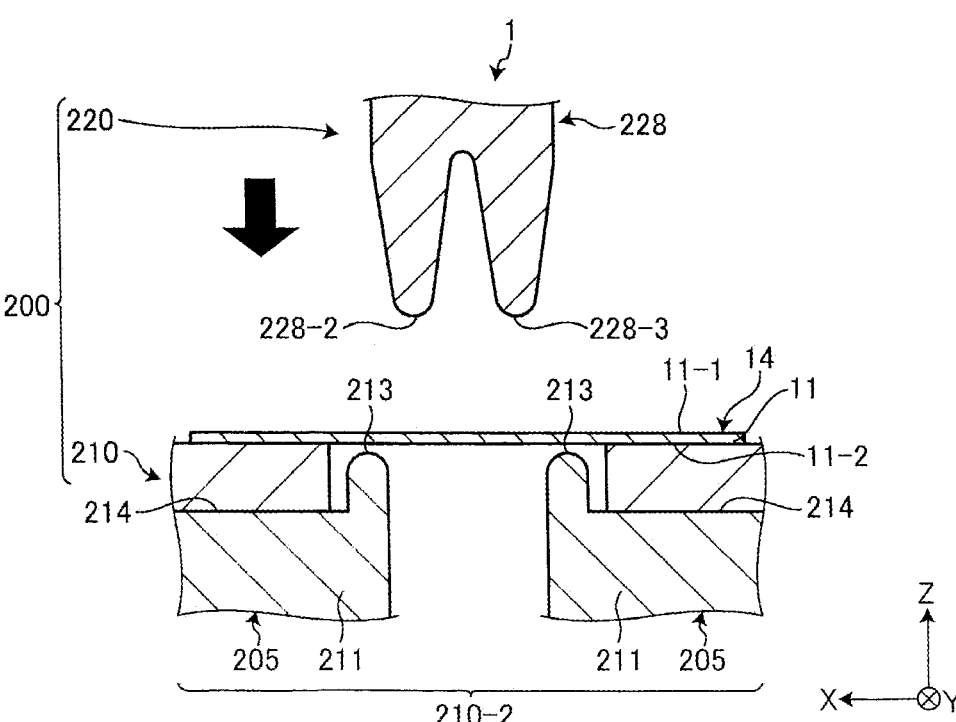
FIG. 9 is a sectional view illustrating a state in which the test apparatus illustrated in FIG. 1 has a chip mounted on a second test region of the support base.
Figure 10:
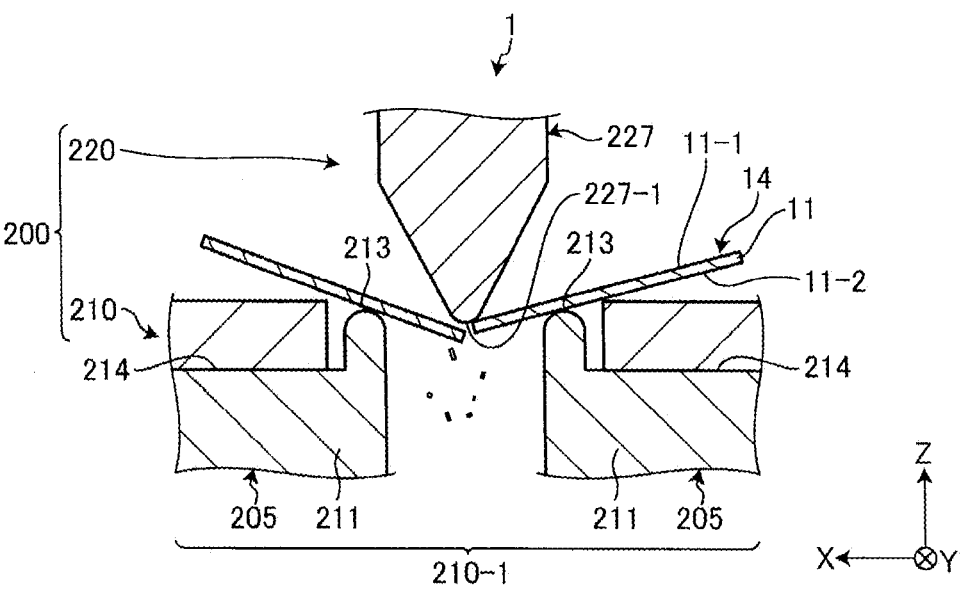
FIG. 10 is a sectional view illustrating a state in which the chip illustrated in FIG. 8 is destroyed.
Figure 11:
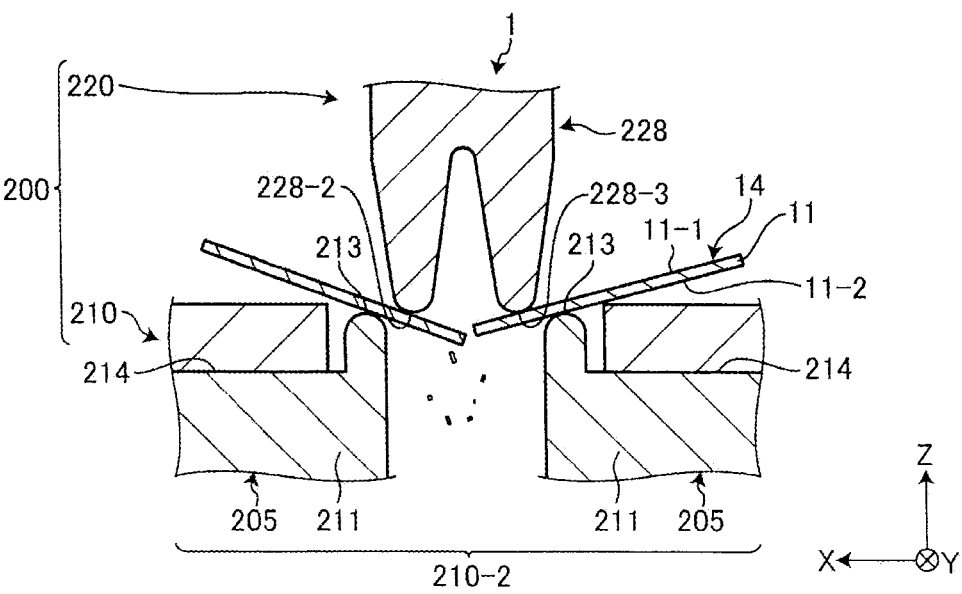
FIG. 11 is a sectional view illustrating a state in which the chip illustrated in FIG. 9 is destroyed.

Description will next be made of a measurement operation in which the test apparatus 1 having the above-described configuration measures a load by destroying the chip 14. FIG. 8 is a sectional view illustrating a state in which the test apparatus illustrated in FIG. 1 has a chip mounted on the first test region of the support base. FIG. 9 is a sectional view illustrating a state in which the test apparatus illustrated in FIG. 1 has a chip mounted on the second test region of the support base. FIG. 10 is a sectional view illustrating a state in which the chip illustrated in FIG. 8 is destroyed. FIG. 11 is a sectional view illustrating a state in which the chip illustrated in FIG. 9 is destroyed.

In the test apparatus 1, an operator or the like installs the cassette 4 housing a plurality of wafer units 17 on the cassette mounting base 3, and inputs measurement conditions to the controller 400 by operating the touch panel 302 or the like. Incidentally, the measurement conditions include information associating, on a one-to-one basis, the position of each chip 14 of each wafer unit 17 with information indicating whether a test to be performed on each chip 14 is the three-point bending test or the four-point bending test.

In the test apparatus 1, when the controller 400 receives a measurement start instruction made by the operator, the controller 400 controls the loading and unloading unit 5 to unload a wafer unit 17 including a wafer 10 to be measured from the cassette 4 and temporarily place the wafer unit 17 on the pair of temporary placement rails 6, and controls the loading and unloading unit 5 to mount the annular frame 16 of the wafer unit 17 temporarily placed on the temporary placement rails 6 onto the lowered frame supporting member 18 of the frame fixing unit 7. The controller 400 controls the frame fixing unit 7 to raise the frame supporting member 18 and fix the wafer unit 17 by the frame fixing unit 7, and thereafter controls the moving mechanism 30 to position the wafer unit 17 fixed by the frame fixing unit 7 above the thrust-up mechanism 50.

In the test apparatus 1, the controller 400 makes the imaging camera 60 image the wafer 10 of the wafer unit 17 fixed to the frame fixing unit 7, and carries out alignment between a predetermined chip 14 of the wafer 10 and the thrust-up mechanism 50. In the test apparatus 1, the controller 400 controls the thrust-up mechanism 50 to raise the thrust-up unit 52 and thrust up the predetermined chip 14, and controls the pickup mechanism 70 and the like to hold the predetermined chip 14 under suction by the collet 76. In the test apparatus 1, the controller 400 controls the chip observation mechanism 100 to image the top surface 11-1, the undersurface 11-2, and the side surfaces specified by the measurement conditions, obtain images thereof, and store the images in the storage device, and thereafter mounts the undersurface 11-2 of the chip 14 onto the pair of elongated supporting units 205 of the strength measuring mechanism 200.

At this time, in the test apparatus 1, when the controller 400 refers to the measurement conditions and the chip 14 held under suction by the collet 76 is a chip on which the three-point bending test is to be performed, the chip 14 is transported to the first test region 210-1 on the support base 210 as illustrated in FIG. 8. In addition, in the test apparatus 1, when the controller 400 refers to the measurement conditions and the chip 14 held under suction by the collet 76 is a chip on which the four-point bending test is to be performed, the chip 14 is transported to the second test region 210-2 on the support base 210 as illustrated in FIG. 9. In this manner, the transporting unit 20 transports the chip 14 on which the three-point bending test is to be performed to the first test region 210-1, and transports the chip 14 on which the four-point bending test is to be performed to the second test region 210-2.

In the embodiment, in the test apparatus 1, the controller 400 controls the strength measuring mechanism 200 to lower the indenters 227 and 228 and the like by the moving mechanism 230, bring the end portion 227-1 or the end portions 228-2 and 228-3 of the indenter 227 or 228 into contact with the top surface 11-1 side of the chip 14, and press the chip 14 by the indenter 227 or 228. In addition, a load (force in the Z-axis direction) applied to the indenter 227 or 228 by the pressing of the chip 14 is measured by the load measuring instrument 223, and a result of the measurement is output to the controller 400 as appropriate.

In the test apparatus 1, the controller 400 controls the strength measuring mechanism 200 to further lower the indenters 227 and 228 and the like to further press the chip 14 by the indenter 227 or 228, so that the contact members 214 supporting the chip 14 are deformed and the chip 14 is bent. As a result, the undersurface 11-2 side of the chip 14 comes into contact with the supporting protrusions 213 of the supporting members 211, the chip 14 is supported by the pair of supporting protrusions 213, and a load applied to the indenter 227 or 228 pressing the chip 14 is increased. Incidentally, at this time, depending on the flexibility of the contact members 214, there may be a case where only the deformation of the contact members 214 occurs and the bending of the chip 14 does not occur.

In the test apparatus 1, the controller 400 controls the strength measuring mechanism 200 to further lower the indenters 227 and 228 and make a pressing force applied to the chip 14 from the indenter 227 or 228 exceed a predetermined value, thereby destroying the chip 14 as illustrated in FIG. 10 and FIG. 11. When the chip 14 is destroyed, the load measured by the load measuring instrument 223 changes from a maximum value to zero. The strength measuring mechanism 200 can thus detect a timing at which the chip 14 is destroyed, from the change in the value of the load measured by the load measuring instrument 223. In addition, the maximum value of the load measured by the load measuring instrument 223 corresponds to the strength of the chip 14. In the test apparatus 1, after the controller 400 detects the timing at which the chip 14 is destroyed, the controller 400 controls the strength measuring mechanism 200 to raise the indenters 227 and 228 by the moving mechanism 230.

As illustrated in FIG. 10, when the test apparatus 1 performs the three-point bending test on the chip 14, the test apparatus 1 destroys the chip 14 mounted on the first test region 210-1 of the support base 210, by pressing the chip 14 by the first end portion 227-1 of the first test indenter 227. In addition, as illustrated in FIG. 11, when the test apparatus 1 performs the four-point bending test on the chip 14, the test apparatus 1 destroys the chip 14 mounted on the second test region 210-2 of the support base 210, by pressing the chip 14 by the second end portion 228-2 and the third end portion 228-3 of the second test indenter 228.

In this manner, when the test apparatus 1 presses the chip 14 supported by the support base 210 by the pressing unit 220, the test apparatus 1 presses and destroys the chip 14 by the first test indenter 227 in the case of performing the three-point bending test, and presses and destroys the chip 14 by the second test indenter 228 in the case of performing the four-point bending test. The first test indenter 227 and the second test indenter 228 are thus configured to be selectable. After the test apparatus 1 measures loads by pressing and destroying chips 14 specified by the measurement conditions by the indenters 227 and 228 in order, the test apparatus 1 houses the wafer unit 17 into the cassette 4 and then ends the measurement operation.

As described above, the test apparatus 1 according to the embodiment includes the first test indenter 227 for performing the three-point bending test as the first test on the chip 14 and the second test indenter 228 for performing the four-point bending test as the second test different from the first test, and the first test indenter 227 and the second test indenter 228 are configured to be selectable when the chip 14 supported by the support base 210 is pressed by the pressing unit 220.

As a result, the test apparatus 1 according to the embodiment produces an effect of being able to perform a plurality of kinds of tests.

In addition, in the test apparatus 1, because the indenters 227 and 228 or the second test indenter 228, in particular, is integrally formed in a plate shape, the second end portion 228-2 and the third end portion 228-3 are integrated with each other, so that it is possible to make a check or an adjustment easily when performing the four-point bending test as the second test in particular.

It is to be noted that the present invention is not limited to the foregoing embodiment or the like. That is, the present invention can be variously modified and carried out without departing from the gist of the present invention. In the present invention, a moving mechanism which moves the support base 210 and the pressing unit 220 relative to each other in the Y-axis direction as the first direction may be provided, and under the measurement conditions, one of the three-point bending test and the four-point bending test may be performed by pressing and destroying the chip 14 mounted on the support base 210 by one of the indenters 227 and 228.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A test apparatus comprising:
   a support base configured to support a lower surface of a test piece;
   a pressing unit configured to press the test piece supported by the support base; and
   a load measuring instrument configured to measure a load applied when the pressing unit presses the test piece;
   the pressing unit including a first test indenter configured to perform a first test by pressing a first test piece supported by the support base, and
   a second test indenter configured to perform a second test different from the first test by pressing a second test piece supported by the support base; and
   the first test indenter and the second test indenter being configured to be selectable when the first test piece or the second test piece supported by the support base is pressed by the pressing unit.

2. The test apparatus according to claim 1, wherein
   the support base includes a pair of supporting units that are arranged in such a manner as to have a predetermined interval from each other and that each extend in a first direction to support the lower surface of the test piece,
   the first test indenter includes a first end portion that abuts against and presses an upper surface of the first test piece supported by the supporting units and that extends in the first direction, and
   the second test indenter includes a second end portion and a third end portion that each abut against and press an upper surface of the second test piece supported by the supporting units and that extend in the first direction, the third end portion being adjacent to the second end portion.

3. The test apparatus according to claim 2, wherein
   the first test indenter and the second test indenter are juxtaposed to each other in the first direction.

4. The test apparatus according to claim 3, wherein
   the support base includes a first test region on which the first test piece to be pressed by the first test indenter is to be mounted and a second test region that is adjacent to the first test region in the first direction and on which the second test piece to be pressed by the second test indenter is to be mounted, and
   the first test region faces the first test indenter, and the second test region faces the second test indenter.

5. The test apparatus according to claim 4, further comprising:
   a transporting unit that has a holding surface for holding the first test piece and the second test piece and that mounts the first test piece and the second test piece thus held onto the support base,
   wherein the transporting unit transports the first test piece to be subjected to the first test to the first test region and transports the second test piece to be subjected to the second test to the second test region.

* * * * *